United States Patent [19]

Chou

[11] Patent Number: 5,169,290
[45] Date of Patent: Dec. 8, 1992

[54] BLADE FOR CENTRIFUGAL FLOW FAN
[75] Inventor: Rudy S. Chou, Liverpool, N.Y.
[73] Assignee: Carrier Corporation, Syracuse, N.Y.
[21] Appl. No.: 788,912
[22] Filed: Nov. 7, 1991
[51] Int. Cl.[5] ............................................. F01D 5/14
[52] U.S. Cl. ............................ 416/236 R; 416/223 B
[58] Field of Search ............... 416/235, 236, 237, 228

[56] References Cited

U.S. PATENT DOCUMENTS

| | | | |
|---|---|---|---|
| 1,864,803 | 6/1932 | Clark | 416/236 |
| 1,903,823 | 4/1933 | Lougheed | 416/223 R |
| 1,943,934 | 1/1934 | Telfer | 416/236 |
| 3,077,173 | 2/1963 | Lang | 416/237 |
| 4,143,536 | 3/1979 | Okamato et al. | 416/223 R |
| 4,434,957 | 3/1984 | Moritz | 416/223 R |
| 4,692,098 | 9/1987 | Razinsky et al. | 416/223 R |
| 4,822,249 | 4/1989 | Eckardt | 416/235 |
| 4,869,644 | 9/1989 | Takigawa | 416/223 R |
| 4,975,023 | 12/1990 | Miura et al. | 416/237 |

Primary Examiner—John T. Kwon

[57] ABSTRACT

A blade (14) for a centrifugal flow fan (11) having forward curved blades. The blade has a boundary layer trip (21) on its pressure surface (14). The trip promotes the transition of the boundary layer from laminar to turbulent flow and enables the layer to remain attached to the pressure surface for a greater distance. The increased amount of attached flow enables greater fan efficiency and reduces fan radiated noise. The boundary layer trip may be of a variety of configurations.

1 Claim, 2 Drawing Sheets

BLADE FOR CENTRIFUGAL FLOW FAN

BACKGROUND OF THE INVENTION

This invention relates generally to fans that move air. More specifically, the invention relates to an improved blade for a centrifugal flow fan having forward curved blades.

A centrifugal flow fan, sometimes called a "squirrel cage" fan, has a generally cylindrical outer envelope with a plurality of blades arranged around and generally parallel to the fan axis of rotation. Air flows axially into the fan and discharges radially through the blades. A centrifugal fan frequently is contained within a scroll housing that serves to direct the air discharged from the fan into a single direction. A forward curved centrifugal flow fan has blades that curve in the direction of rotation of the fan from the leading edge to the trailing edge of the blade.

The general principles of fluid flow, including laminar and turbulent boundary layer flow and boundary layer separation, are well known in the art. As related to fans, premature boundary layer separation on the blade surfaces results in increased radiated noise levels and reduced air moving efficiency due to increased aerodynamic drag. Unlike an aircraft airfoil, which is generally subject to premature boundary layer separation only on its suction (or upper) surface, a forward curved centrifugal fan blade can suffer premature boundary layer separation on both its suction and pressure surfaces. This premature separation is due to a number of factors including the great amount of flow turning the air experiences as it enters the fan blades and mismatch of blade incidence angles.

In the fans commonly used in heating ventilation and air conditioning (HVAC) applications, the blade tip speeds are relatively low, in the range below Mach 0.15. In such a fan, the air flow is principally laminar in nature and thus is more susceptible to premature boundary layer separation than if the flow were turbulent. Premature boundary layer separation increases both the blade drag and radiated noise level of a fan.

SUMMARY OF THE INVENTION

The present invention is an improved blade for a centrifugal flow fan of the forward curved type. The configuration of the blade reduces premature boundary layer separation on the pressure surface of the blade, thus reducing drag and fan radiated noise level.

The use of a boundary layer trip on the suction surface of a blade or airfoil is well known in the art. The vortex generators on the upper surface of a high performance aircraft wing are just one example of such a trip. During low speed flight at high wing angles of attack, the vortex generators break up the laminar boundary layer flow and allow the boundary layer to remain attached to the wing over a greater distance than would be possible without them and thus enable the wing to develop more lift.

In the blade of the invention, boundary layer control is achieved by providing a boundary layer trip on the pressure side of the blade. The mechanisms present are not completely understood, but it is believed that the trip functions much like a vortex generator. The trip causes a transition from laminar to turbulent flow in the boundary layer on the pressure surface of the blade at a lower Reynolds number. The transition from laminar to turbulent flow allows the boundary layer to remain attached over a greater portion of the surface with a resultant reduction in drag and noise. A fan having blades made according to the teaching of the present invention has achieved an input power reduction of 8 percent and a 1.6 dBA reduction in noise.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENT

Figure 1:
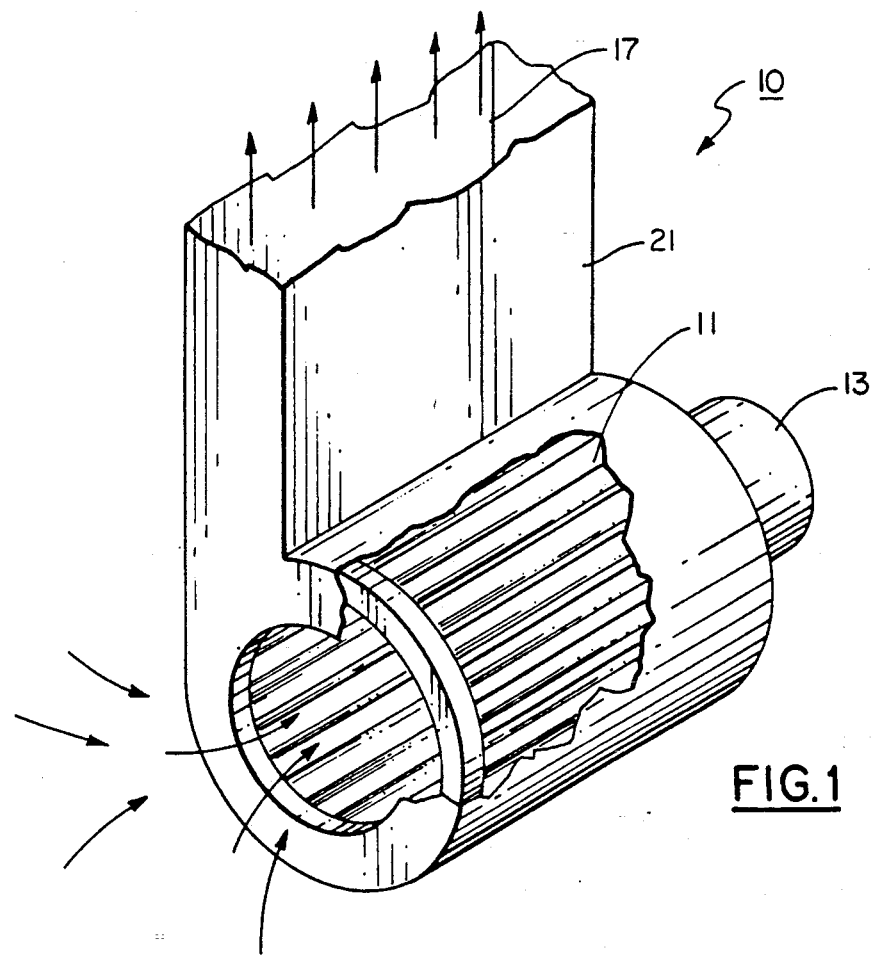
FIG. 1 is an isometric view, partially broken away, of a centrifugal flow fan installed in a scroll housing.

FIG. 1, in a partially broken away isometric view, depicts a centrifugal flow fan of the type that would employ blades made according to the teaching of the present invention. Fan assembly 10 comprises fan 11 mounted in scroll housing 12. Motor 13 drives fan 11. When the fan is in operation, air enters scroll housing 12 and the interior of fan 11 along the axis of rotation of the fan. The air turns and is drawn radially into and through the fan blades. Scroll housing 12 collects the air as it exits around the periphery of fan 11 and directs it out through duct outlet 17.

Figure 2:
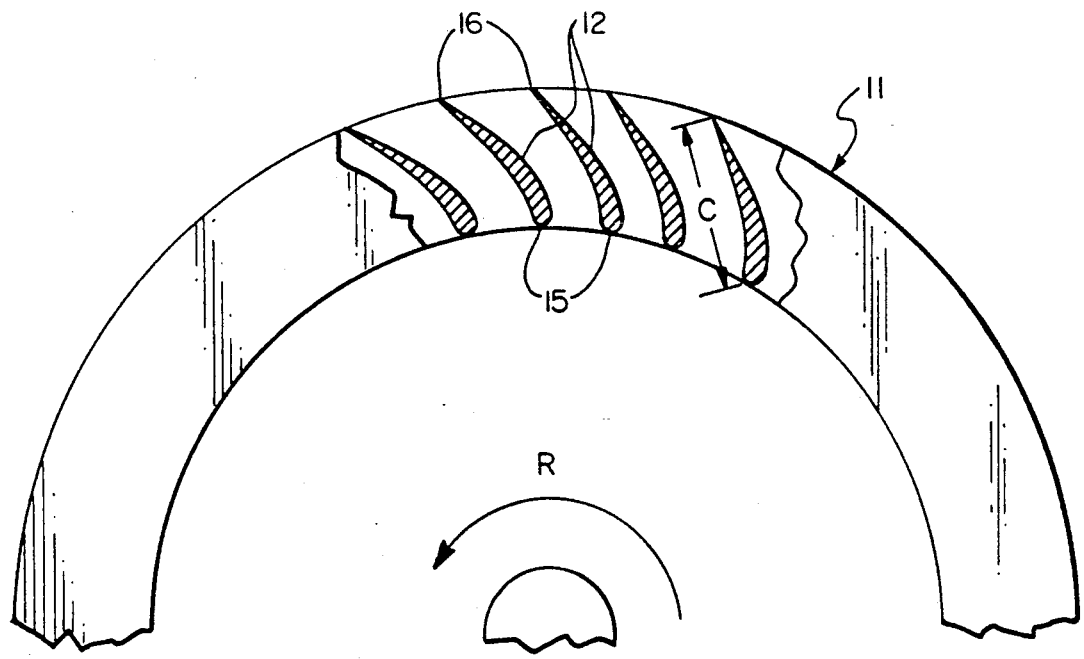
FIG. 2 is a front elevation view, partially broken away, of a portion of a forward curved centrifugal flow fan.

FIG. 2, in a front elevation view, partially broken away, depicts a portion of centrifugal flow fan 11. Being a forward curved centrifugal flow fan, its blades 14 sweep forward, with respect to direction of rotation R, from their leading edges 15 to their trailing edges 16. Each of blades 12 has chord length C, the distance from leading edge 15 to trailing edge 16.

Figure 3A:
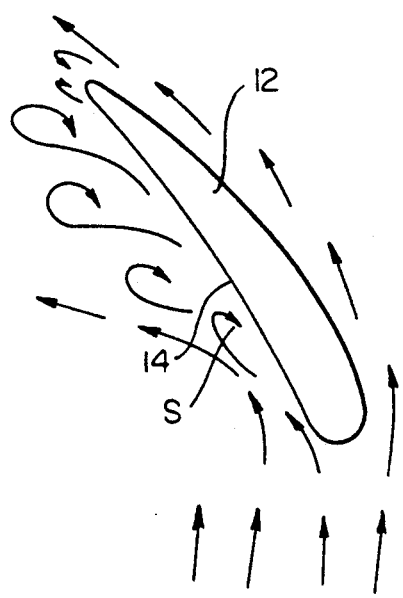
FIGS. 3a and 3b are diagrams showing the airflow around a centrifugal fan blade respectively without and with a boundary layer trip on its pressure side.
Figure 3B:
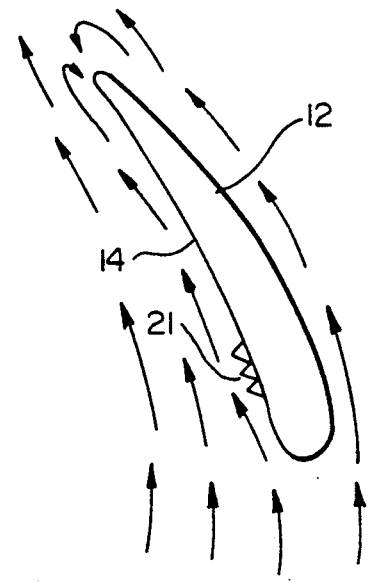
Figure 4A:
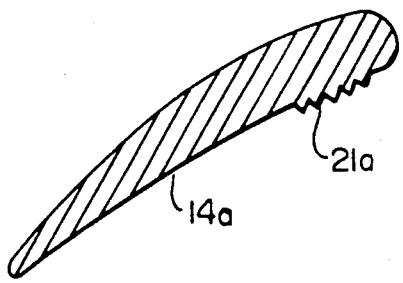
FIGS. 4a through 4d are, respectively, chord sections of five different embodiments of the present invention.
Figure 4B:
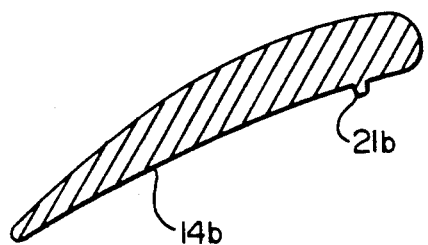
Figure 4C:
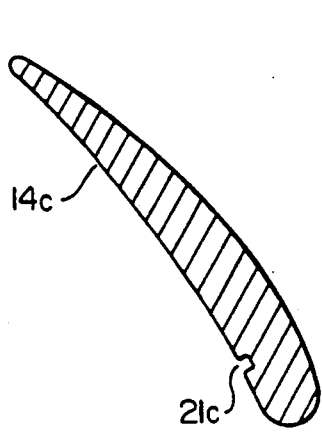
Figure 4D:
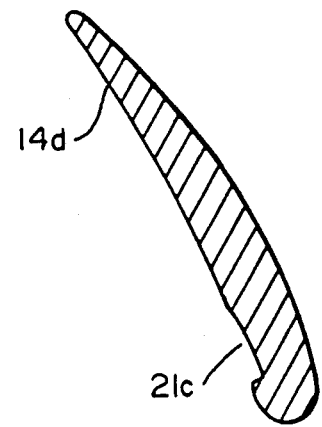

FIG. 3a depicts diagrammatically the airflow over blade 12 without the boundary layer trip of the present invention. Air flows smoothly over blade pressure surface 14 until reaching point of separation s, where the flow boundary layer becomes separated from pressure surface 14. Downstream of that point, the flow separates from the blade forming an area of turbulence and reverse flow. FIG. 3b depicts diagrammatically the airflow over blade 12 with boundary layer trip 21. As the air flows over trip 12, the trip causes a transition from laminar to turbulent flow thus enabling the boundary layer to remain attached for a greater portion of pressure surface 14. A decrease in the amount of flow separation results in an increase in blade efficiency and a decrease in fan radiated noise.

Experimental data indicates that the trip should be located on pressure surface 14 at a point that is about five to fifty percent of the blade chord length from leading edge 15.

FIGS. 4a through 4d, in laterally sectioned views, depict some of the various embodiments of the blade of the present invention. The trip may comprise a roughened or serrated portion 21a of pressure surface 14a (FIG. 4a), a chine or spoiler 21b extending out of surface 14b (FIG. 4b), a notch or cavity 21c in surface 14c (FIG. 4c) or a ramp and step 21d on surface 14d (FIG.

4d). Other configurations are possible. A trip should extend laterally over generally the entire span of the blade.

What is claimed is:

1. An improved centrifugal flow fan blade comprising,
   a leading edge (15),
   a trailing edge (16),
   a chord length (C) and
   a pressure surface (14), in which the improvement comprises
   means for promoting the formation of a turbulent boundary layer located on said pressure surface in which said promoting means is located from five to fifty percent (5-50%) of said chord length from said leading edge.

* * * * *